United States Patent [19]

Raidel

[11] Patent Number: 4,705,294
[45] Date of Patent: Nov. 10, 1987

[54] AIR SUSPENSION ASSEMBLY WITH UNIVERSAL PIVOTED HANGER BEARINGS AND RIGID MOUNT ANGULAR TORQUE SPRING-BEAM

[76] Inventor: John E. Raidel, Rte. 1, Box 400-M, Springfield, Mo. 65804

[21] Appl. No.: 881,962

[22] Filed: Jul. 3, 1986

[51] Int. Cl.[4] .............................................. B60G 11/26
[52] U.S. Cl. ..................................... 280/711; 267/31; 267/32
[58] Field of Search ....................... 280/711, 712, 713; 267/31, 32

[56] References Cited

U.S. PATENT DOCUMENTS

| | | | |
|---|---|---|---|
| 3,434,707 | 3/1969 | Raidel | 280/712 |
| 3,547,215 | 12/1970 | Bird | 280/713 |
| 3,785,673 | 1/1974 | Harbers, Jr. et al. | 280/712 |
| 4,309,045 | 1/1982 | Raidel | 280/711 |
| 4,465,298 | 8/1984 | Raidel, Sr. | 280/711 |
| 4,541,653 | 9/1985 | Raidel | 280/711 |
| 4,580,798 | 4/1986 | Roelofs | 280/712 |

Primary Examiner—John J. Love
Assistant Examiner—Kenneth R. Rice
Attorney, Agent, or Firm—Rogers, Howell, Moore & Haferkamp

[57] ABSTRACT

An air ride suspension having a step spring pivotally mounted from a front hanger by a universal bushing mount. A vertical step positions the trailing end of the step spring below the leading end and supports a transverse bolster beam for connection to the lower side of an air spring. The upper side of the air spring is connected to a seat that is fastened to the vehicle chassis. All the fasteners are bolts so that the suspension system can be readily used as a conversion for a vehicle suspension system. The air spring preferably supports two-thirds of the axle load with about one-third distributed to the step spring.

8 Claims, 7 Drawing Figures

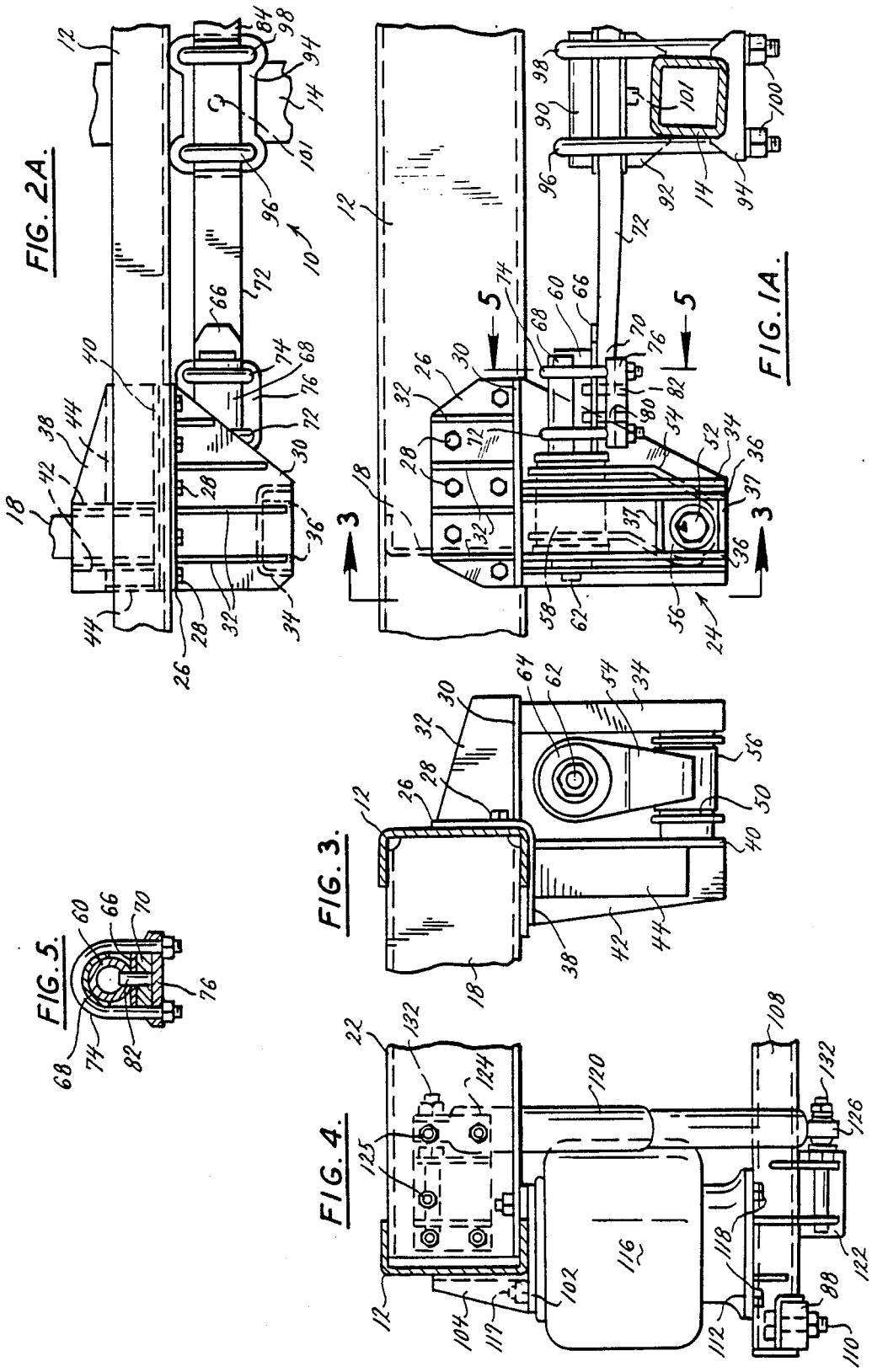

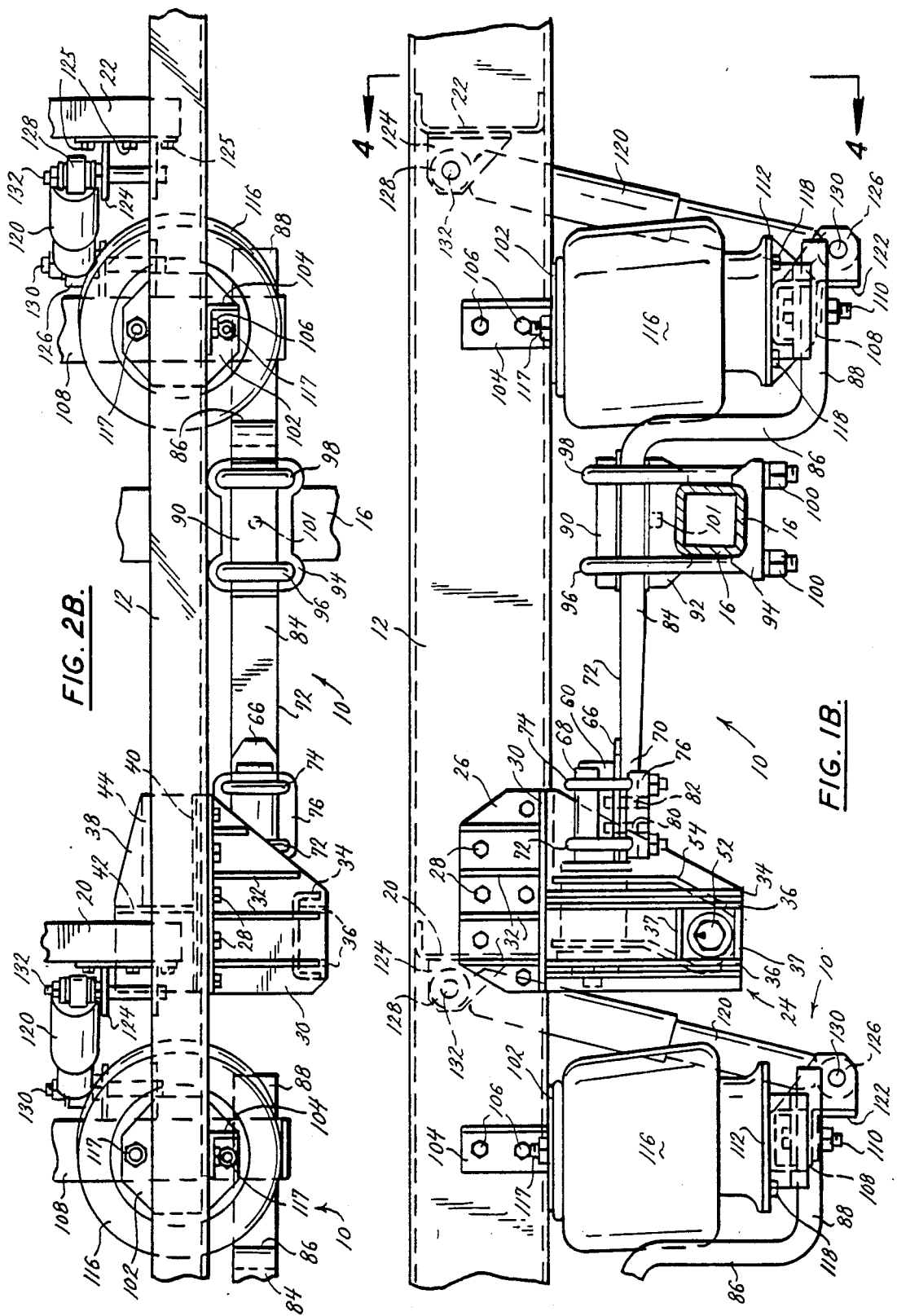

AIR SUSPENSION ASSEMBLY WITH UNIVERSAL PIVOTED HANGER BEARINGS AND RIGID MOUNT ANGULAR TORQUE SPRING-BEAM

BACKGROUND OF THE INVENTION

This invention relates to an air suspension system and particularly to a suspension system incorporating a spring steel step spring that is connected to a hanger by a universal pivoted hanger bearing assembly. The step spring also acts as a beam having a trailing end supporting an end of a transverse bolster beam. The bolster beam provides a lower seat for the air spring. The axle is connected to an intermediate point on the step spring. Preferably the connection distributes the load such that the air spring carries two-thirds of the axle load.

This inventor is also the inventor of U.S. Pat. Nos. 3,434,707, 4,309,045, 4,465,298, and 4,541,653. The subject matter of those patents, except for that incorporated by reference in such patents, is incorporated herein by reference.

Various suspension systems have been designed and developed incorporating an air spring. Some of these air spring syspension systems have been particularly intended for conversion of existing installations. Typically these conversions involve the replacement of an existing leaf spring assembly by an air ride suspension assembly. The disadvantages of the prior art conversion suspension systems have included the fact that they are cumbersome, heavy, expensive and the conversion is difficult. Also, the prior art conversion suspensions typically do not result in a good ride because of restrictions imposed by the fact that they are conversions and not OEM systems. The suspension system of the present invention provides an excellent ride while affording easy installation.

The present suspension system is easily installed as a replacement for an existing suspension system. All of the connections are by bolts rather than by welding. Also, the entire suspension system is light weight, and yet it incorporates characteristics of a leaf spring combined with an air spring, both cooperating to produce a better ride. The suspension system can be installed on a single axle or tandem axle vehicle. In fact, there is no limit to the number of axles that the suspension system can accommodate, because each suspension system is selfcontained and not dependent upon the next one. Therefore, this suspension system is highly versatile as a conversion system. Even though all components of the suspension system are steel, the total weight is less than 500 pounds per axle.

BRIEF SUMMARY OF THE INVENTION

The invention comprises an air spring suspension system that can be installed as original equipment but is highly desirable as a conversion system, typically to replace a leaf spring suspension system. This air spring suspension system includes a single piece spring steel step spring having a leading end and a trailing end.

The leading end of the step spring is connected by a special dowelled U-bolt clamping assembly to a shaft. The shaft is journalled in a bushing allowing longitudinal rotational torque movement. That bushing is itself mounted in a pivot arm that is pivoted on a transverse bushing that is supported by a hanger. The hanger depends from the vehicle chassis to which it is bolted. Rearward of the leading end of the step spring but on the upper longitudinal leg, there is a clamping and axle seat assembly for connecting the spring to the vehicle axle. Again, the connections are by bolts.

Rearward of the axle, the spring has a downwardly extending vertical section that leads to a lower horizontal trailing end of the spring. A bolster beam lying transversely between the sides of the vehicle extends across the lower trailing end of the step spring and supports a lower spring seat for the bottom side of an air spring. The bolster beam allows the air spring to be located below the chassis side frame member while the step spring is positioned outboard of the side frame member. The upper side of the air spring is mounted to a plate on a bracket that is attached to the vehicle chassis by bolts. Thus the entire installation is readily completed with bolts.

BRIEF DESCRIPTION OF THE DRAWINGS

FIG. 1A is a side elevation view of the forward portion of the suspension assembly wherein a dual axle vehicle is shown for illustrative purposes;

FIG. 1B is a side elevation view of the rear portion of the suspension assembly and also shows an identical suspension assembly for a second axle;

FIG. 2A is a top plan view of the forward portion of the suspension assembly shown in FIG. 1A;

FIG. 2B is a top plan view of the rear portion of the suspension assembly shown in FIG. 1B;

FIG. 3 is a view in section taken along the plane of the line 3—3 of FIG. 1A;

FIG. 4 is a view in section taken along the plane of the line 4—4 of FIG. 1B; and FIG. 5 is a view in section taken along the plane of the line 5—5 of FIG. 1A but illustrating a modified dowel arrangement.

DETAILED DESCRIPTION OF THE INVENTION

For illustrative purposes, this suspension system 10 is shown installed on a tandem axle vehicle. Since each suspension in the system is identical to the other, only one need be described. Also, the suspension system can be used equally effectively for a single axle or a multiple axle vehicle. The vehicle is the kind having a chassis including a left side rail frame member 12, a forward axle 14, and a trailing axle 16. Because of the independence of the suspension system, it can be used for a drive axle, a steering axle, or a tandem axle. Typically, the chassis also has cross frame members 18, 20 and 22 extending from the left side frame member 12 and to the right side frame member (not shown).

Each suspension assembly 10 incorporates a hanger assembly 24. The hanger assembly 24 includes a bracket 26 fastened by bolts 28 to the side frame member 12. A plate 30 projects laterally outwardly from the bracket 26 and is supported by flanges 32. A vertical channel member 34 is welded to and extends downwardly from the plate 30. The channel 34 has reinforcing flanges 36 to stiffen it. At the lower ends of the reinforcing plates 36, there are vertically spaced horizontal plates 37 welded therebetween to form a box. The bracket 26 has a leg 38 that wraps underneath the side frame member 12. Depending downwardly from the leg 38 of the bracket 26 and welded thereto is a vertical plate 40 having transverse reinforcing gusset plates 42 and a transverse reinforcing plate 44 welded to it, together with additional longitudinal reinforcing plates 44 and 46.

A bushing 50 is mounted on an eccentric bolt 52 that extends between the channel member 34 and the plate 40 within the box defined by the reinforcing plates 36 and 37. The bushing 40 and eccentric bolts 42 are formed and function as described in U.S. Pat. No. 3,510,149. A swing arm 54 has a sleeve 56 at its lower end journalled about the bushing 50. Thus the bushing 50 on the eccentric bolt 52 allows the position of the swing arm 54 to be adjusted longitudinally of the chassis while permitting the swing arm 54 to revolve about a transverse axis. The swing arm 54 is angular, offsetting its upper end 58 rearwardly. At this upper end 58, a shaft 60 is fastened by a bolt 62 about another bushing 64, thereby allowing rotation of the shaft 60 about a longitudinal axis. The shaft 60 is welded to a flat pad 66.

An arcuate plate 68 extends over the top of the shaft 60, enlarging the diameter thereof. The leading end 70 of a spring steel step spring 72 bears against the flat pad 66 and is fastened in place by a pair of U-bolts 72 and 74 tightened against a lower block 76. A pair of dowels 80 and 82 lock the shaft 60 to the step spring 72. The dowels 80 and 82 may extend through the lower block 76 as shown in FIGS. 1A and 1B and if so, are welded to the block 76. Alternatively, as shown in FIG. 5, the dowels 80 and 82 may be located between the sides of the two U-bolts 72 and 74 and may extend only through the spring 70 and the shaft 60 so that the block 76 (which has no dowel holes and is installed after mounting of the dowels) will hold the dowels 80 and 82 in place without welding. The dowels reduce the shear stress on the U-bolts as the axle moves up and down.

The step spring 72 includes a horizontal section 84 that leads to a vertical section 86 and terminates in a rearward horizontal section 88. The horizontal section 84 is long enough to extend over the axle 14 or 16. There is a block 90 positioned above the step spring 72, another block 92 positioned between the spring 72 and the axle 14 or 16, and another block 94 positioned below the axle 14 or 16. These blocks, together with the axle, are clamped together by a pair of U-bolts 96 and 98 and tightened in place by nuts 100. One or more dowels 101 lock the step spring 72 to the clamping assembly by extending into the block 92.

A plate 102 is welded to a bracket 104 that is fastened to the side frame member 12 by bolts 106. A bolster beam 108 extends transversely between the two sides of the vehicle and across the horizontal section 88 of the step spring 72. The bolster beam 108 is fastened to the step spring 72 by a bolt 110. A plate 112 with suitable reinforcing gussets is welded to the bolster beam 108 to serve as a lower spring mount. An air spring 116 is fastened to the upper plate 102 by bolts 117 and to the lower plate 112 by bolts 118.

To accommodate a shock absorber 120, the bolster beam is furnished with a bracket 122 welded to it. Another bracket 124 is fastened by bolts 125 to the chassis transverse beam 20 or 22. The shock absorber 120 has lower and upper ends 126 and 128 connected to the brackets 122 and 124, respectively, by bolts 130 and 132.

INSTALLATION AND OPERATION

The drawings show this suspension system installed on a tandem axle vehicle. As can be seen, each suspension system 10 is complete and independent of itself. Therefore, the suspension system 10 can be used not only for a tandem axle vehicle, but for a vehicle having any number of axles.

For this installation, the existing leaf spring suspension system is removed. The hanger assembly 24 is readily installed by the bolts 28. The hanger assembly 24 may be furnished with the rocker arm 54 already mounted in place on the bushing 50 and the shaft 60 already mounted in place in the bushing 64. Alternatively, these parts can be connected after the hanger assembly 24 is installed.

Next the bracket 104 is mounted to the chassis side frame member 12 by the bolts 106. The step spring 72 is fastened to the axle 14 or 16 by assembling the blocks 90, 92 and 94 with the U-bolts 96 and 98 and tightening the nuts 100 in place. The sleeve 68 is positioned on the shaft 60 and the U-bolts 72 and 74 are mounted in place to clamp the step spring 72. The dowels 80 and 82 should be positioned before the block 76 is installed if the embodiment of FIG. 5 is used, and then the nuts for the U-bolts 72 and 74 can be tightened.

Next, the bolster beam 108 may be installed using the bolts 110 to fasten the bolster beam 108 to the trailing end 88 of the step spring 72. The bolster beam 108 already has the plate 112 and its reinforcing gussets and plates welded together. Therefore, the air spring 116 can be fastened between the upper and lower plates 102 and 112 by the bolts 117 and 118, respectively. A cross radius rod (now shown, but known in the art) should be connected between the axle and the chassis to prevent transverse axle movement.

Finally, the shock absorber 120 can be installed by tightening the bolts 130 and 132 to the brackets 124 and 126. Other connections for the shock absorber 120 may be provided as desired.

In operation, varying loads on the axle 14 or 16 produce both vertical and torsional loads at the connection of the axle to the step spring 72. The vertical motions are accommodated by rocking actions about the transverse axis provided by the bushing 50. The torsional forces are accommodated by limited rotation of the shaft 60 within the bushing 64 about a longitudinal axis. The dowels 80 and 82 minimize shear stresses on the U-bolts 72 and 74.

The forces transmitted by vertical movements of the axle 14 or 16 are distributed approximately one-third through the upper spring arms 84 and two-thirds to the air spring 116. This is because the point of clamping of the spring 72 to the axle is about two-thirds the distance from the eccentric bolt 52 to the air spring 116. Therefore, the loads are transmitted from the lower trailing spring section 88 to the bolster beam 108 to which the air spring 116 is connected. Thus, the suspension system 10 provides an excellent ride because loads are absorbed both by the step spring 72 and by the air spring 116 in a predetermined one-third/two-third ratio.

There are various changes and modifications which may be made to the invention as would be apparent to those skilled in the art. However, these changes or modifications are included in the teaching of the disclosure, and it is intended that the invention be limited only by the scope of the claims appended hereto.

What I claim is:

1. A vehicle suspension system for a vehicle having left and right chassis frame members and axle means below the frame members, comprising left and right step springs, each step spring comprising a unitary spring steel member having a forward generally horizontal section having a leading end, a rearward generally horizontal section having a trailing end, a generally vertical section between and contiguous with the forward and rearward sections and displacing the rearward section below the forward section, left and right hangers depending respectively from the left and right frame members, left and right first bushings supported respectively by the left and right hangers, left and right arms respectively mounted on the left and right first bushings for limited revolution about transverse axes as permitted by the first bushings, left and right second bushings supported respectively by the left and right arms, each left and right second bushings including a central shaft means for mounting the leading ends of the left and right step springs respectively on the central shaft of the left and right second bushings for limited rotation about longitudinal axes as permitted by the second bushings, means to connect the axle means to the step springs intermediate the ends thereof, and left and right air spring means respectively mounted between the left and right chassis frame members and the trailing ends of the left and right step springs.

2. The suspension system of claim 1 wherein the mounting means comprises U-bolts, and dowel means extending into the step springs and the shafts to relieve shear stress on the U-bolts.

3. The suspension system of claim 2 wherein the dowels are located between the legs of the U-bolts, and a block held by the U-bolts against each step spring and bearing against the dowels to retain them in place.

4. The suspension system of claim 1 wherein the step spring is outboard of the air spring.

5. The suspension system of claim 1 wherein each central shaft is substantially cylindrical and the step spring is generally rectangular in cross section.

6. The suspension system of claim 5 wherein the leading end of each step spring overlaps a cylindrical segment of a central shaft, means to clamp said leading end to said cylindrical segment, and means to prevent each step spring from rocking about a longitudinal axis relative to the central shaft to which it is clamped.

7. The suspension system of claim 6 wherein the last-named means includes a block welded to said cylindrical segment and having a flat face for bearing against a side of said leading end.

8. The suspension system of claim 1 wherein each hanger includes a mounting member projecting outboard of the frame member from which the hanger depends, transversely spaced vertical bushing supports depending downwardly from and having lower ends spaced below the mounting member, at least one of the bushing supports being outboard of said frame member, a first bushing being mounted between and adjacent the lower ends of the bushing supports, the arm mounted on said first bushing projecting upwardly therefrom within the space between the bushing supports and having an upper end spaced above said first bushing, a second bushing being mounted in upper end of said arm.

* * * * *